United States Patent
Kanthak et al.

(10) Patent No.: US 9,715,874 B2
(45) Date of Patent: Jul. 25, 2017

(54) TECHNIQUES FOR UPDATING AN AUTOMATIC SPEECH RECOGNITION SYSTEM USING FINITE-STATE TRANSDUCERS

(71) Applicant: Nuance Communications, Inc., Burlington, MA (US)

(72) Inventors: Stephan Kanthak, Aachen (DE); Jan Vlietinck, Merelbeke (BE); Johan Vantieghem, Antoing (BE); Stijn Verschaeren, Stekene (BE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/929,084

(22) Filed: Oct. 30, 2015

(65) Prior Publication Data
US 2017/0125012 A1    May 4, 2017

(51) Int. Cl.
*G10L 15/06* (2013.01)
*G10L 25/51* (2013.01)

(52) U.S. Cl.
CPC ............ *G10L 15/063* (2013.01); *G10L 25/51* (2013.01); *G10L 2015/0635* (2013.01)

(58) Field of Classification Search
CPC ....... G10L 15/00; G10L 15/06; G10L 15/065; G10L 15/075; G10L 15/20; G10L 15/28; G10L 2015/00; G10L 2015/06; G10L 2015/0635; G10L 2015/0636
USPC .......................... 704/244, 231, 236, 234, 255
See application file for complete search history.

(56) References Cited

U.S. PATENT DOCUMENTS

| | | | | |
|---|---|---|---|---|
| 5,526,465 A | * | 6/1996 | Carey | G10L 17/00 704/243 |
| 2014/0136210 A1 | * | 5/2014 | Johnston | G10L 15/07 704/275 |
| 2014/0229177 A1 | | 8/2014 | Kanthak et al. | |
| 2015/0095026 A1 | * | 4/2015 | Bisani | G10L 15/32 704/232 |

OTHER PUBLICATIONS

Mohri et al., The Design Principles of a Weighted Finite-State Transducer Library. Theoretical Computer Science. 2000;231(1):17-32.

\* cited by examiner

*Primary Examiner* — Qi Han
(74) *Attorney, Agent, or Firm* — Wolf, Greenfield & Sacks, P.C.

(57) ABSTRACT

Techniques are described for updating an automatic speech recognition (ASR) system that, prior to the update, is configured to perform ASR using a first finite-state transducer (FST) comprising a first set of paths representing recognizable speech sequences. A second FST may be accessed, comprising a second set of paths representing speech sequences to be recognized by the updated ASR system. By analyzing the second FST together with the first FST, a patch may be extracted and provided to the ASR system as an update, capable of being applied non-destructively to the first FST at the ASR system to cause the ASR system using the first FST with the patch to recognize speech using the second set of paths from the second FST. In some embodiments, the patch may be configured such that destructively applying the patch to the first FST creates a modified FST that is globally minimized.

20 Claims, 13 Drawing Sheets

TECHNIQUES FOR UPDATING AN AUTOMATIC SPEECH RECOGNITION SYSTEM USING FINITE-STATE TRANSDUCERS

BACKGROUND

Finite-state transducers (FSTs) have been used in automatic speech recognition (ASR) as a tool for mapping representations of input speech to recognized forms, such as text. An FST can be constructed to "transduce" input of any form to output of any other form; thus, FSTs can be used to represent any of various components of an ASR system, such as an acoustic model that maps input acoustic features of speech to phonemic representations, a phonetic model that maps a phonemic representation of input speech to words, a linguistic model that maps words to recognizable word sequences (e.g., sentences), etc. In general, an FST can be represented as a directed graph structure in which states are connected by arcs, each arc having a specified direction of transition (e.g., from a source state to a target state) and one or more labels. The labels may include an input and an output, and in some cases a weight, although some arcs may lack an input, an output, and/or a weight. In traversing an FST as a component of speech recognition, the ASR system transitions from state to state within the FST by following arcs defined by the speech input received. While traversing a particular state in the FST, the next input (e.g., acoustic frame, phone, or word) in the received sequence determines which arc to follow to transition out of the current state, and the arc's target (destination) state determines the next state to process in the FST. A particular path of arcs and states from the initial state to the final state in the FST corresponds to a particular input sequence (corresponding to the input labels of the arcs along the path), and the output labels of the arcs in that path determine the output sequence (e.g., the recognition result) provided by the FST for that particular input. Further background on FSTs and their use in ASR can be found in *Mohri* et al., "Speech Recognition with Weighted Finite-State Transducers," in Rabiner and Huang (eds.), *Handbook on Speech Processing and Speech Communication, Part E: Speech Recognition*, Springer-Verlag, 2008. This publication is incorporated herein by reference in its entirety.

In some ASR systems, a number of FSTs may be compiled together into a single graph-based data structure for use during recognition. For example, FSTs representing different recognizable word sequences may be compiled into a single FST representing the grammar or language model of the ASR system. As another example, FSTs representing phonetic models of word pronunciations may be compiled with one or more FSTs representing linguistic models of recognizable word sequences, to create an integrated FST that transduces from a phone-level input sequence to a recognized word sequence (e.g., sentence). In yet another example, acoustic models, such as hidden Markov models (HMMs), may be compiled with phonetic models, or with both phonetic and linguistic models, to create an integrated graph structure that transduces from an input sequence of acoustic frames to recognized words, or to a recognized word sequence (e.g., one or more sentences).

SUMMARY

One type of embodiment is directed to a method of updating an automatic speech recognition (ASR) system that, prior to the update, is configured to perform ASR using a first finite-state transducer (FST), the first FST comprising a first set of paths representing recognizable speech sequences, the method comprising: accessing a second FST comprising a second set of paths representing speech sequences to be recognized by the updated ASR system; by analyzing the second FST together with the first FST, extracting a patch capable of being applied non-destructively to the first FST at the ASR system to cause the ASR system using the first FST with the patch to recognize speech using the second set of paths from the second FST; and providing the extracted patch to the ASR system as an update.

In one embodiment, extracting the patch comprises configuring the patch such that destructively applying the patch to the first FST creates a modified version of the first FST that comprises the second set of paths from the second FST and is globally minimized.

Another type of embodiment is directed to apparatus comprising at least one processor, and at least one processor-readable storage medium storing processor-executable instructions that, when executed by the at least one processor, perform a method of updating an automatic speech recognition (ASR) system that, prior to the update, is configured to perform ASR using a first finite-state transducer (FST), the first FST comprising a first set of paths representing recognizable speech sequences, the method comprising: accessing a second FST comprising a second set of paths representing speech sequences to be recognized by the updated ASR system; by analyzing the second FST together with the first FST, extracting a patch capable of being applied non-destructively to the first FST at the ASR system to cause the ASR system using the first FST with the patch to recognize speech using the second set of paths from the second FST; and providing the extracted patch to the ASR system as an update.

Another type of embodiment is directed to at least one computer-readable storage medium encoded with computer-executable instructions that, when executed, perform a method of updating an automatic speech recognition (ASR) system that, prior to the update, is configured to perform ASR using a first finite-state transducer (FST), the first FST comprising a first set of paths representing recognizable speech sequences, the method comprising: receiving a patch extracted based on the first FST and a second FST comprising a second set of paths representing speech sequences to be recognized by the updated ASR system, the patch being configured to cause the ASR system using the first FST with the patch to recognize speech using the second set of paths from the second FST; receiving a speech input; and recognizing the speech input using the received patch applied non-destructively to the first FST.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
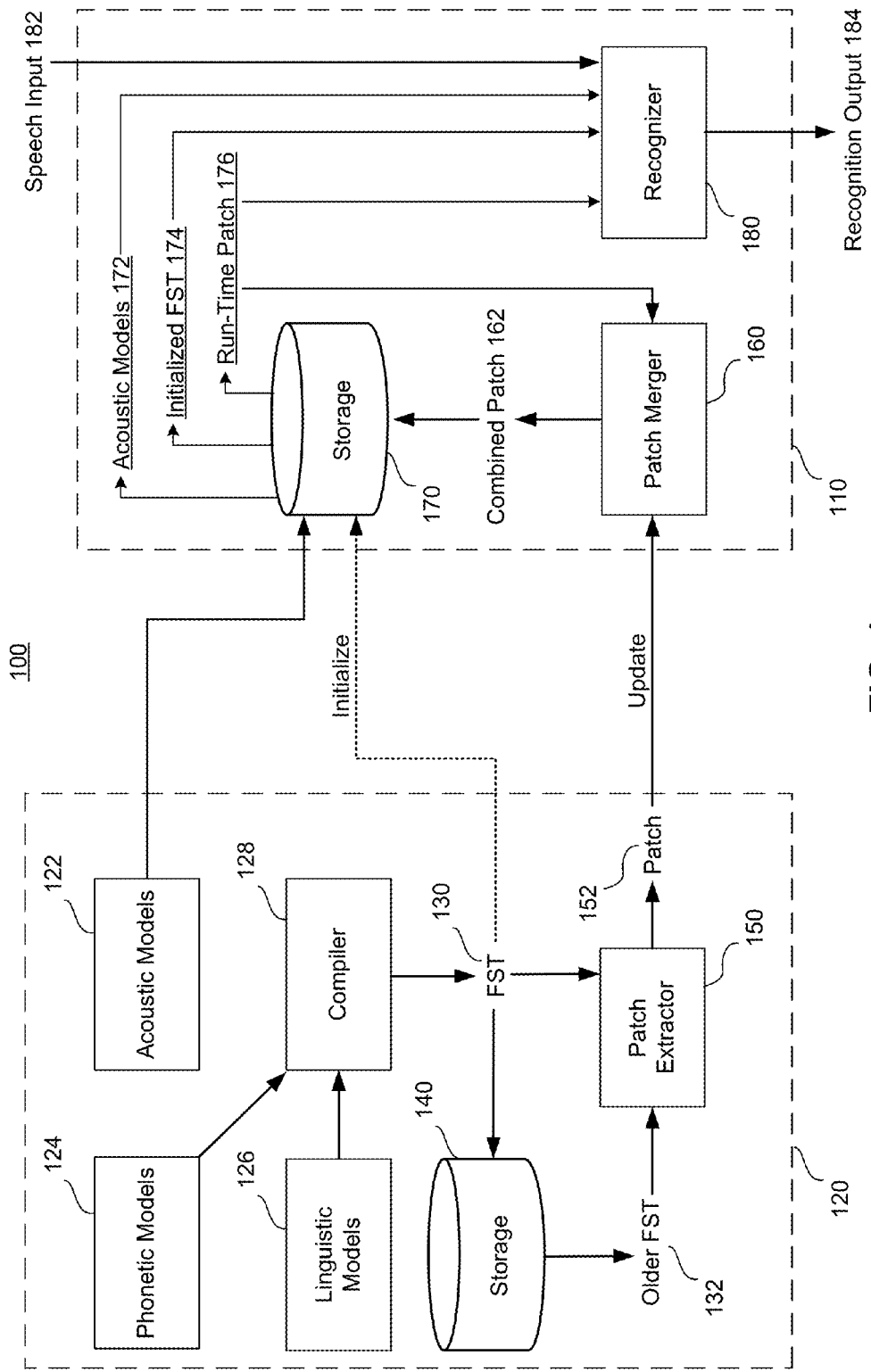
FIG. 1 illustrates an exemplary operating environment for an ASR system in accordance with some embodiments.

The inventors have recognized that a compiled FST for speech recognition can become quite large and can require a significant amount of storage space to be kept at the ASR system. This may especially be the case where an FST is compiled from multiple ASR models, such as when phonetic models and linguistic models are combined into an FST that transduces directly from phone-level input representations to recognized word sequences (e.g., sentences). The inventors have further recognized that such large FSTs may be difficult to transmit to ASR systems embedded in devices such as mobile phones and automobile systems, which may typically receive recognition software updates over communication channels with limited bandwidth (e.g., cellular data channels). In addition, the inventors have appreciated that a compiled FST used in speech recognition may sometimes require updating to reflect any updates to the underlying models (e.g., acoustic models, phonetic models, linguistic models, etc.) from which the FST is compiled, and/or any updates to the training data from which the underlying models are generated. When the updated FST is compiled at the server (which may have greater processing resources than the embedded client ASR systems for compiling large FSTs), the compiled FST's large size may make regular and/or prompt transmission of the update to the client device difficult over the bandwidth-limited channel, and it may be necessary for the updated FST to overwrite the previous FST at the client ASR system to meet storage constraints, as the inventors have recognized.

The inventors have appreciated, however, that it may not be necessary to provide to an ASR system a full replacement FST when the update to the previous version of the FST is merely incremental—e.g., adding and/or removing a number of states and/or arcs that is small compared to the number in the entire FST. This may be the case, for example, when an update to a voice-enabled GPS navigation system is to add and/or change a small number of streets and addresses among the much larger total number that can be recognized by the ASR system. Accordingly, the inventors have developed techniques, described further below, for providing an update to an ASR system in the form of a patch encoding the incremental differences between the ASR system's previously stored FST and its updated version. The inventors have appreciated that the relatively small size of such a patch may make it capable of being transmitted quickly and efficiently from server to client devices over bandwidth-limited channels, and further may allow for it to be applied non-destructively to the previously stored FST at the client ASR system. The original FST at the ASR system may thus be maintained in non-volatile storage as opposed to being overwritten, and may be used in conjunction with the patch during speech recognition to perform as if it were the updated full FST. The inventors have further appreciated that benefits of efficient transmission, storage, and/or processing may be achieved by making the patch as small as possible, and have developed techniques for extracting the patch in a manner that globally minimizes the updated FST formed by the original FST with the patch applied.

Accordingly, some embodiments described herein relate to techniques for updating an ASR system that uses an FST, which techniques may address one or more of the above-discussed shortcomings of traditional methods, and/or may provide one or more of the foregoing benefits. However, some embodiments are not limited to any of these benefits, and it should be appreciated that some embodiments may not provide any of the above-discussed benefits and/or may not address any of the above-discussed deficiencies that the inventors have recognized in conventional techniques.

In some embodiments, an ASR system, prior to being updated, may be configured to perform ASR using a first FST (referred to herein as FST A) which includes a first set of paths representing recognizable speech sequences. The FST A may be any suitable level of FST, such as a (context-dependent) phone-to-sentence-level transducer, an acoustics-to-sentence-level transducer, an acoustics-to-word-level transducer, or any other suitable type of FST used for ASR. In some embodiments, a process may be performed to update the ASR system to perform ASR as if using a second FST (referred to herein as FST B) which includes a second set of paths representing speech sequences to be recognized by the updated ASR system. This FST B may be, for example, an updated version of FST A, such as may be compiled from updated models (e.g., acoustic, phonetic, and/or linguistic models), and/or may have added and/or removed paths as compared with FST A.

In some embodiments, by analyzing FST B together with FST A, a patch may be extracted, capable of being applied non-destructively to FST A at the ASR system to cause the ASR system, using FST A with the patch, to recognize speech using the paths contained in FST B. Exemplary implementation techniques for extracting such a patch are described below. As used herein, applying the patch "non-destructively" to FST A means maintaining FST A with its unmodified set of paths in non-volatile storage accessible to the ASR system, and using the patch to modify the traversal of FST A in volatile memory during the process of recognizing input speech, to perform the recognition using the paths of FST B. Exemplary implementation techniques for such non-destructive patch application are described below. The extracted patch may be provided to the ASR system as an update; in some embodiments, this may include transmitting the patch over one or more networks from a server to the ASR system residing on a client device.

In some embodiments, the patch may be constructed in such a manner that if the patch were destructively applied to FST A, a modified version of FST A would be created that is globally minimized. As used herein, "minimization" means reducing the number of states and arcs in an FST to the minimum number required to represent the set of paths (i.e., recognizable speech sequences) encoded by the FST. Exemplary techniques for extracting such a patch that would create a globally minimized modified FST are described below. In some embodiments, alternatively or additionally, the patch may be constructed in such a manner that if the patch were destructively applied to FST A, a modified version of FST A would be created that is fully determinized. As used herein, "determinization" means ensuring that no state in the FST has more than one outgoing arc with the same input label. Exemplary techniques for extracting such a patch that would create a fully determinized modified FST are described below.

It should be appreciated that the foregoing description is by way of example only, and some embodiments are not limited to providing any or all of the above-described functionality, although some embodiments may provide some or all of the functionality described herein.

The techniques described herein can be implemented in any of numerous ways, and are not limited to any particular detailed implementation. Thus, while examples of specific implementation techniques are described below, it should be appreciated that the examples are provided merely for purposes of illustration, and that other implementations are possible.

One illustrative application for techniques described herein is for use in updating an ASR system. An exemplary operating environment 100 for such a system is illustrated in FIG. 1. The exemplary operating environment includes ASR system 110 and server 120, each of which may be implemented in any suitable form, as embodiments are not limited in this respect. For example, each of server 120 and ASR system 110 may be implemented as a single stand-alone machine, or may be implemented by multiple distributed machines that share processing tasks in any suitable manner. ASR system 110 and/or server 120 may be implemented as one or more computers; an example of a suitable computer is described below. In some embodiments, each of server 120 and ASR system 110 may include one or more tangible, non-transitory processor-readable storage devices storing processor-executable instructions, and one or more processors that execute the processor-executable instructions to perform functions described herein. The storage devices may be implemented as computer-readable storage media (i.e., tangible, non-transitory computer-readable media) encoded with the processor-executable instructions; examples of suitable computer-readable storage media are discussed below.

As depicted, exemplary server 120 includes compiler 128 and patch extractor 150, as well as components managing acoustic models 122, phonetic models 124, and linguistic models 126, and ASR system 110 includes patch merger 160 and recognizer 180. Each of these processing components may be implemented in software, hardware, or a combination of software and hardware. Components implemented in software may comprise sets of processor-executable instructions that may be executed by the one or more processors of the respective device to perform the functionality described herein. Each of compiler 128, patch extractor 150, and the model managing components within server 120, and patch merger 160 and recognizer 180 on ASR system 110, may be implemented as a separate component (e.g., implemented by hardware and/or software code that is independent and performs dedicated functions of the component), or any combination of components of a device may be integrated into a single component or a set of distributed components (e.g., hardware and/or software code that performs two or more of the functions described herein may be integrated, the performance of shared code may be distributed among two or more hardware modules, etc.). In addition, any one of these components may be implemented as a set of multiple software and/or hardware components. Although the example operating environment of FIG. 1 depicts compiler 128, patch extractor 150, and model components implemented together on server 120 and patch merger 160 and recognizer 180 implemented together on ASR system 110, this is only an example; in other examples, any or all of the components may be implemented on one or more separate machines, or parts of any or all of the components may be implemented across multiple machines in a distributed fashion and/or in various combinations. It should be understood that any such component depicted in FIG. 1 is not limited to any particular software and/or hardware implementation and/or configuration.

In some embodiments, compiler 128 may operate, e.g., via execution of program instructions by the one or more processors of server 120, to compile an FST 130 from one or more ASR models, such as acoustic models 122, phonetic models 124, and/or linguistic models 126. In the specific example illustrated in FIG. 1, phonetic models 124 and linguistic models 126 are used by compiler 128 to generate FST 130, while acoustic models 122 are provided directly to ASR system 110 (e.g., in storage 170), without being compiled into FST 130. In one particular embodiment, FST 130 may transduce an input sequence of context-dependent phones to an output word sequence (e.g., sentence) that is part of the valid recognizable grammar or language model of ASR system 110. This particular FST 130 may be compiled by combining and expanding sentence-level FSTs derived from linguistic models 126 by inserting phone-to-word-level FSTs derived from phonetic models 124 at the locations of arcs with the corresponding word input labels in the sentence-level FSTs. It should be appreciated, however, that this is merely one example, and embodiments are not limited in this respect. As discussed above, FST 130 may be any suitable level of FST based on any suitable type(s) of ASR model(s). Similarly, one particular example of acoustic models 122 is a set of hidden Markov models (HMMs); however, other types of acoustic models may alternatively or additionally be used. In the specific example illustrated in FIG. 1, acoustic models 122 are provided to ASR system 110 to be accessed during recognition of a speech input 182 in conjunction with the phone-to-sentence FST. For example, during recognition of speech input 182, the acoustic models may first be applied to translate speech input 182 to a sequence of context-dependent phones, which may then be input to the FST to map to a recognized word sequence (e.g., sentence). However, this also is merely an example, and is not required in all embodiments. In some other embodiments, for example, acoustic models 122 may also be input to compiler 128 to create an FST 130 that transduces acoustic inputs.

In some embodiments, compiler 128 may generate different versions of FST 130 at different times, as phonetic models 124 and/or linguistic models 126 (and/or acoustic models 122, in some embodiments) are updated between versions. When ASR system 110 is initialized, in some embodiments a version of FST 130 that has been compiled at that time (e.g., the most recently compiled version of FST 130 at the time of initialization of ASR system 110) may be provided to ASR system 110 from server 120 and stored in storage 170 within or accessible to ASR system 110. In some embodiments, this version of FST 130 used to initialize ASR system 110 may also be retained in storage 140 within or accessible to server 120.

In some embodiments, when a new updated version of FST 130 is produced by compiler 128, the previous version may be retrieved from storage 140 as older FST 132. The new FST 130 may then be analyzed together with older FST 132 by patch extractor 150, e.g., via execution of program instructions by the one or more processors of server 120, to extract patch 152. As discussed above, in some embodiments patch extractor 150 may construct patch 152 to encode differences between new FST 130 and older FST 132, such that patch 152 could be applied non-destructively to older FST 132 at ASR system 110 to cause ASR system 110 using older FST 132 and patch 152 to recognize speech as if using new FST 130. In some embodiments, each time a newer version of FST 130 is generated by complier 128, patch extractor 150 may retrieve the previous older FST 132 from storage 140 and may extract a patch 152 encoding the delta between the current up-to-date FST 130 and its immediately previous version. Thus, in some embodiments, each subsequent patch 152 may represent an incremental update to FST 130.

In some embodiments, as discussed above, patch extractor 150 may construct patch 152 such that it could be applied destructively to older FST 132 to result in a modified FST that encodes the same paths as FST 130 and is globally minimized. This may be done in any suitable way that achieves the global minimization of the modified FST resulting from destructive application of the patch. Exemplary techniques for achieving this result are described later below.

In some embodiments, the extracted patch 152 may be provided as an update from server 120 to ASR system 110. ASR system 110 may be part of a client device in some embodiments, such as a mobile phone, a tablet, a PDA, a music player, a GPS navigation device, a voice-enabled device in an automobile, and/or any other suitable client device. The patch update may be provided to ASR system 110 from server 120 over any suitable network connection(s). In some embodiments, the update may be transmitted over a channel having limited bandwidth, such as a cellular data channel. In some embodiments, in addition to the FST patch, one or more additional differential data structures may also be transmitted in the update to ASR system 110, to reflect other updates to ASR components, such as new and/or modified HMMs in embodiments where they are not part of the FST.

In some embodiments, the acoustic model initialized at ASR system 110 may include an HMM dictionary that assigns each context-dependent phone a sequence of HMM state IDs, where the ID of a state links that state to its Gaussian probability distributions as stored in a data structure. In some such embodiments, an update to the HMM dictionary may be sent from server 120 to ASR system 110 in the form of a new ID-to-data map for any modified HMM state(s). Some embodiments may alternatively or additionally update one or more other data structures used in conjunction with the FST for speech recognition at ASR system 110. For example, some embodiments may make use of a data structure including mappings that convert output IDs from the FST to external IDs or strings for the recognition output. Some embodiments may make use of named meta-information, such as rule and/or tag names originating from a grammar formalism to specify the linguistic model. In some embodiments, any of these data may be updated by transmitting new ID-to-data maps for any parts that have changed. Some embodiments may make use of data specifying locations in the compiled FST graph at which other FSTs can be inserted, and/or locations in the FST graph at which subparts can be activated and/or deactivated. In some embodiments, updates may add new insertion and/or activation locations to the list and/or delete locations that are no longer to be used. These are merely some examples; any suitable additional data structures may be used for ASR in association with an FST. In some embodiments, incremental updates to any of these data structures may be transmitted from server 120 to ASR system 110 in any suitable form, together with in the same update, or separate from patch 152 for the FST itself.

When the patch 152 is the first patch update received after initialization of ASR system 110, in some embodiments the received patch 152 may be stored directly in storage 170 for use in recognition. During recognition of a speech input 182 by ASR system 110, in some embodiments the initialized FST 174 as provided from server 120 at the initialization of ASR system 110, together with the patch 176 that is stored at ASR system 110 by the run time of the recognition process, may be retrieved from storage 170 (or from any other suitable storage accessible to ASR system 110 where the initialized FST 174 and the run-time patch 176 may be stored together or separately) and provided to recognizer 180. In embodiments in which separate acoustic models have been provided to ASR system 110, the current acoustic models 172 may also be retrieved from storage 170 (or from any other suitable storage accessible to ASR system 110) and provided to recognizer 180 for use in recognition. Recognizer 180 may then operate, in some embodiments, e.g., via execution of program instructions by the one or more processors of ASR system 110, to apply run-time patch 176 non-destructively to initialized FST 174 in the process of recognizing speech input 182, resulting in producing recognition output 184 in a process equivalent to using the updated FST 130 on speech input 182.

As discussed above, in applying run-time patch 176 non-destructively to initialized FST 174, in some embodiments ASR system 110 may retain the unmodified initialized FST 174 in non-volatile storage 170 from which the unmodified initialized FST 174 may be accessed during recognition. In some embodiments, furthermore, ASR system 110 may not store in non-volatile storage any updated version of initialized FST 174 resulting from applying run-time patch 176 to it. Instead, in some embodiments, recognizer 180 may initiate traversal of initialized FST 174, as retrieved from non-volatile storage 170, to recognize speech input 182. Run-time patch 176 may be applied non-destructively to initialized FST 174 during this recognition process in any suitable way. For instance, in one specific exemplary technique, during the traversal of initialized FST 174 in volatile memory during speech recognition, upon encountering a state in initialized FST 174 for which there is a modified version in the run-time patch 176, recognizer 180 may switch to traversal of the modified version of the encountered state in the run-time patch 176, to recognize the speech input 182.

One exemplary implementation of run-time patch 176 may thus be a set (e.g., list, table, etc.) of states, including modified versions of states in initialized FST 174 and new states not present in initialized FST 174, together with the outgoing arcs of each state in the patch 176 and an ID of the target state of each of the outgoing arcs. In such a specific implementation, for example, recognizer 180 may consult a look-up table (e.g., provided with the patch in the update from server 120) for the ID of each state visited during traversal of the initialized FST 174 to determine whether there is a corresponding modified version of the state in the patch 176. If a modified version exists, recognizer 180 may switch to traverse the modified state in the patch 176 instead of the original state in the initialized FST 174. When traversing a (modified or new) state in the patch 176, the outgoing arcs and target state IDs attached to that state in the patch 176 may determine the next state to be visited, which may be part of the patch 176 or of the original initialized FST 174. In some embodiments, the patch 176 may list all outgoing arcs of all states listed in the patch; while in other embodiments, for modified states, the patch 176 may only list the arcs that have changed (e.g., fully specifying any new arcs, and listing only the arc IDs for any arcs being removed in the modification of the state). By listing only the changed arcs for states that were in the original initialized FST 174 and are modified in the patch 176, some embodiments may further reduce the size of the patch 176, saving transmission and storage overhead. However, the foregoing are merely examples, and embodiments are not limited to any particular implementation details for a patch or its application during recognition. In some alternative embodiments, a patch may even be applied destructively at ASR system 110, e.g., by overwriting states and their outgoing arcs in initialized FST 174 stored in non-volatile storage 170 with the corresponding modified states and outgoing arcs contained in the patch.

In some embodiments, when a second or subsequent patch 152 is received from server 120 at ASR system 110, patch merger 160 may operate, e.g., via execution of program instructions by the one or more processors of ASR system 110, to merge the newly received patch 152 with the patch 176 previously stored at ASR system 110, forming combined patch 162. For example, where ASR system 110 was originally initialized with FST A, the first patch received as an update and stored at ASR system 110 may represent the update of FST A to its next version, FST B. When a subsequent patch is received as an update from FST B to the next version, FST C, in some embodiments patch merger 160 may retrieve the A→B patch from storage 170 and merge it with the newly received B→C patch, forming a combined A→C patch that can be applied non-destructively to FST A to perform recognition as if using FST C. This combined patch 162 may then be stored in non-volatile storage 170 (or any other suitable non-volatile storage accessible to ASR system 110), from which it may be retrieved as run-time patch 176 for application to initialized FST 174 in the next recognition process. This is merely one example, however, as other arrangements for patch management are also contemplated. For example, in some embodiments, patch merging may be performed at server 120 instead of at ASR system 110, and consolidated patches may be transmitted from server 120 to ASR system 110. In some other embodiments, some patch merging may be performed at server 120, and some patch merging may be performed at ASR system 110. In some embodiments, server 120 may perform patch merging for some client ASR systems, while other client ASR systems may receive unmerged patches and perform their own patch merging. These and any other suitable distribution of patch processing tasks are possible in connection with various embodiments.

The merging of patches representing consecutive FST updates may be done in any suitable way. In one specific non-limiting example, the lists of modified and new states (with their outgoing arcs and those arcs' target state IDs) from both the older patch and the newer patch may be combined, and any state that is listed as modified or new in the older patch and is also listed as modified in the newer patch may be deleted from the list from the older patch, such that only the most recent modified version of that state from the newer patch remains in the combined patch. However, this is merely one example of a possible patch merging technique, and others are possible. In some embodiments, states included in the combined patch may have associated labels indicating whether each state is a modified version of a state that was originally present in the initialized FST 174 or a new state with respect to the initialized FST 174. In one exemplary implementation, the states labeled in the combined patch as being modified versions of original states may include (1) states listed as modified states in the newer patch, except for states listed as new in the older patch and modified in the newer patch, and (2) states listed as modified states in the older patch, except for states listed as modified in the older patch and modified again in the newer patch. The states labeled in the combined patch as being new states with respect to the initialized FST 174 may include (1) all states listed as new states in the newer patch, and (2) states listed as new in the older patch and modified in the newer patch. These states may be identified to determine their correct versions and identifications in the combined patch in any suitable way. In one non-limiting example, the "new" states in the combined patch may be found using a graph traversal algorithm (such as depth first or breadth first) using the "modified" states in the combined patch as root nodes. Visited states may be marked so that they are not visited twice, and all visited states listed as new states in the older patch or in the newer patch may be added to the set of "new" states in the combined patch. When, during graph traversal, a state is encountered that was new in the older patch and then modified in the newer patch, the modified version of that state from the newer patch, instead of the "new" version of that state from the older patch, may be added to the set of "new" states in the combined patch. It should be appreciated, however, that these exemplary specific algorithms are provided for purposes of illustration and are not intended to be limiting. Any suitable technique for implementing patch merging may be used.

Also, in some other embodiments, patch merging may not be performed. In some embodiments, for example, consecutive patches received at ASR system 110 may simply be stored unmerged as a patch set, and may be applied together non-destructively to initialized FST 174 during recognition of a speech input. Thus, in some embodiments, recognizer 180 may initiate traversal of initialized FST A during recognition, and may concurrently consult look-up tables provided with the A→B patch and the B→C patch to determine whether any visited states are modified in either patch. If a visited state is listed as modified in both patches, recognizer 180 may preferentially switch to the modified state as provided in the most recent patch (e.g., the B→C patch). Additionally, while traversing modified and new states provided in the A→B patch, recognizer 180 may consult the look-up table provided with the B→C patch, and switch to the newly modified version of any visited state listed as having been further modified in the B→C patch.

In some embodiments, retaining the original initialized FST 174 in storage 170 and applying patches non-destructively during recognition may allow ASR system 110 to process a speech input using multiple versions of the FST, resulting in multiple alternative recognition results. For example, in some embodiments, recognizer 180 may compute a first recognition result for speech input 182 using only initialized FST 174, and may compute a second recognition result for the same speech input 182 using run-time patch 176 applied non-destructively to initialized FST 174. This may allow recognizer 180, for example, to compare how speech input 182 would be recognized by FST A with how it would be recognized by FST B. In some embodiments, a final recognition result may be determined by comparing the first and second recognition results, such as by selecting the recognition result having the highest confidence score computed in any suitable way. In some embodiments, if the best-scoring recognition result is one produced using an out-of-date version of the FST, an alert may be generated to inform the user of ASR system 110 that there is a more up-to-date way of saying the speech input provided.

Figure 2:
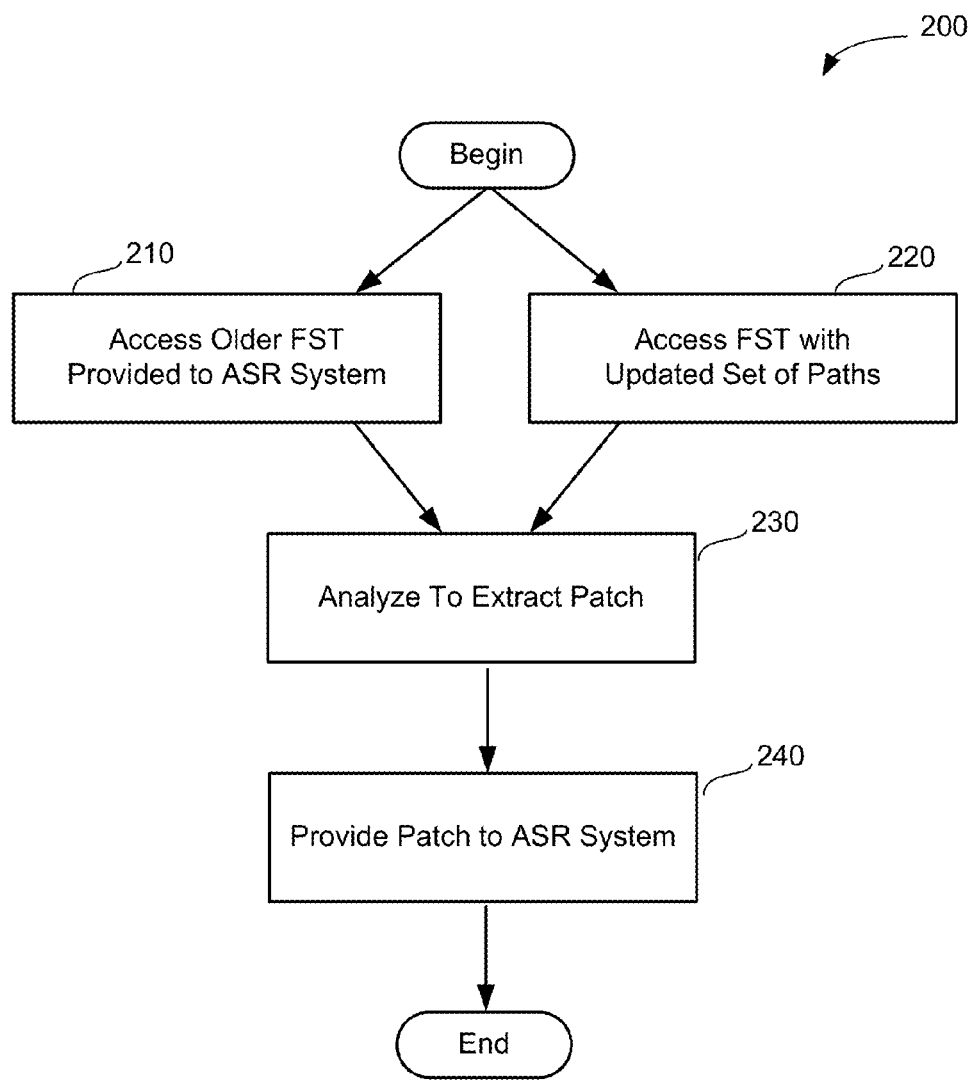
FIG. 2 illustrates an exemplary method of updating an ASR system in accordance with some embodiments.

It should be appreciated from the foregoing that one embodiment is directed to a method 200 for updating an ASR system, as illustrated in FIG. 2. Method 200 may be performed, for example, by one or more components of a server 120 such as patch extractor 150, although other implementations are possible, as method 200 is not limited in this respect. Method 200 begins at acts 210 and 220, which may be performed in any order with respect to each other, and may even be performed concurrently. At act 210, an older FST may be accessed that has previously been provided to the ASR system. The reference herein to an "older" FST does not necessarily refer to an FST that was created at an earlier point in time, but rather to an FST for which there is a more up-to-date version that has been compiled. At act 220, this more up-to-date version of the FST, having an updated set of paths, may be accessed. At act 230, the updated FST may be analyzed together with the older FST to extract a patch capable of being applied non-destructively to the older FST at the ASR system to cause the ASR system using the older FST with the patch to recognize speech using the updated set of paths from the updated FST. Method 200 ends at act 240, at which the extracted patch may be provided to the ASR system as an update.

Figure 3:
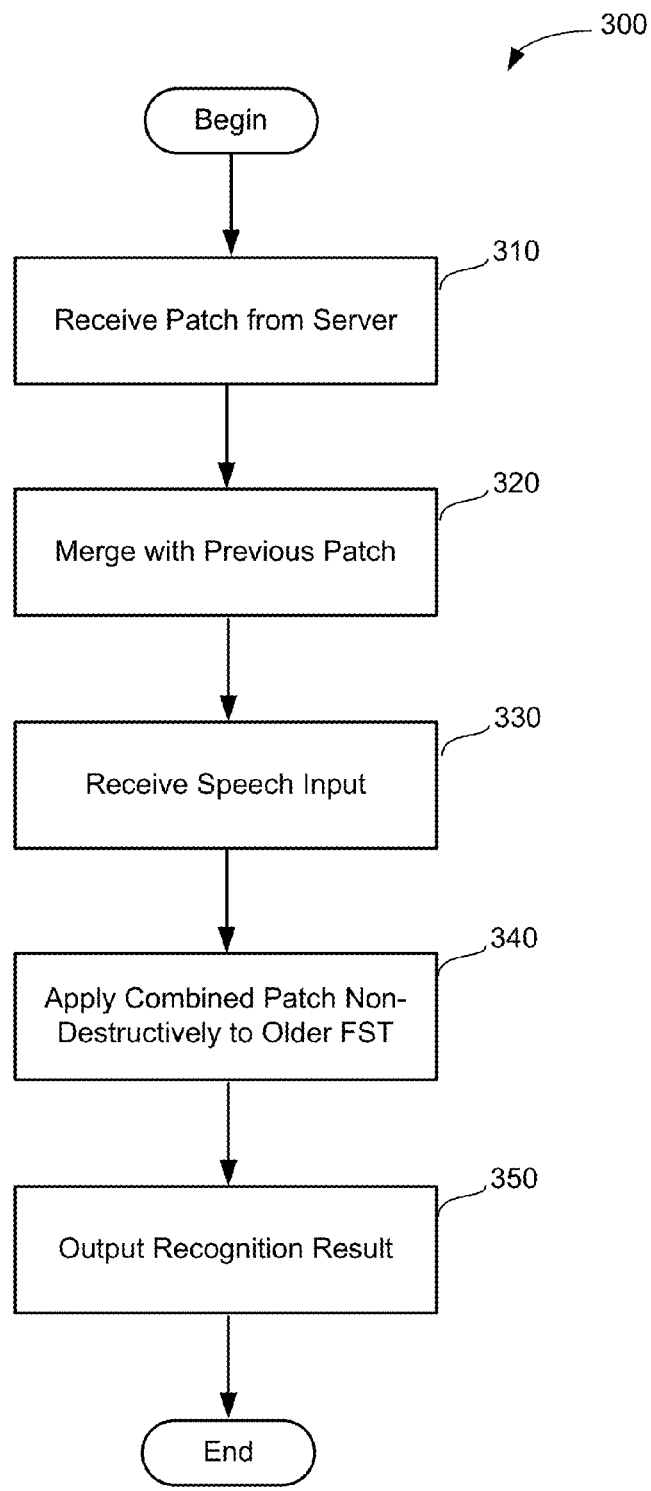
FIG. 3 illustrates an exemplary method of updating and using an ASR system in accordance with some embodiments.

It should further be appreciated from the foregoing that another embodiment is directed to a method 300 for updating and using an ASR system, as illustrated in FIG. 3. Method 300 may be performed, for example, by one or more components of an ASR system 110 such as patch merger 160 and/or recognizer 180, although other implementations are possible, as method 300 is not limited in this respect. Method 300 begins at act 310, at which a patch may be received at an ASR system from a server providing updates to the ASR system. At act 320, in some embodiments, the newly received patch may be merged with any patch(es) previously stored at the ASR system, to form a combined patch. Exemplary techniques for performing such patch merging are described above. At act 330, a speech input may be received for recognition. During the recognition process, at act 340, the combined patch may be applied non-destructively to an older FST stored at the ASR system, causing the ASR system to recognize the speech input as if using an updated version of the older FST. Method 300 ends at act 350, at which the recognition result from this ASR process may be output.

As discussed above, in some embodiments, a patch may be constructed such that destructively applying the patch to the original FST would create a modified version of that FST that includes the set of paths from the newer FST and is also globally minimized. This may be done in any suitable way that achieves the global minimization, as embodiments are not limited to any particular detailed implementation. For purposes of illustration, one exemplary set of algorithms for constructing the patch in a manner that achieves the global minimization is described below and illustrated in FIGS. 4-8. It should be appreciated, however, that this specific illustrative example is not intended to be limiting, and other implementations are possible.

Figure 4:
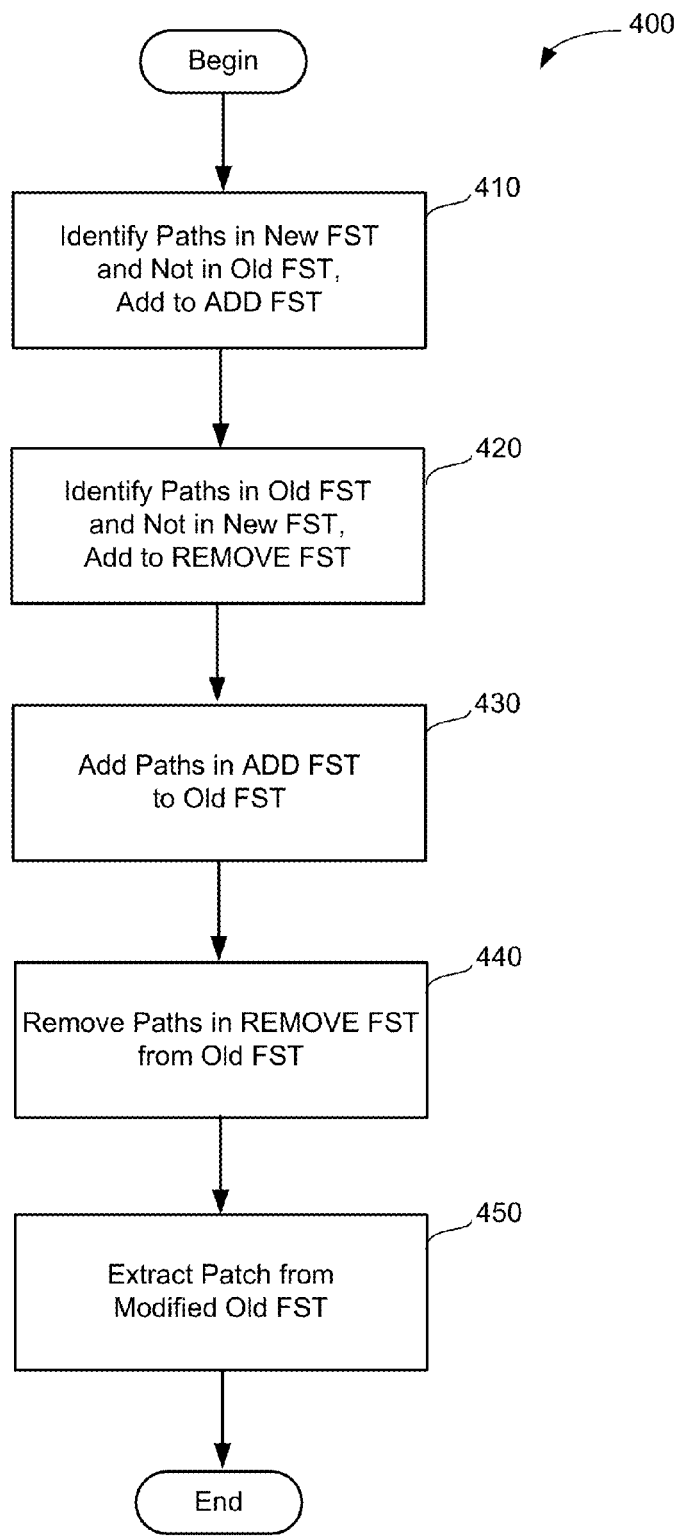
FIG. 4 illustrates an exemplary algorithm for extracting a patch in accordance with some embodiments.

FIG. 4 illustrates an exemplary algorithm 400 suitable for constructing a patch capable of being applied non-destructively to an Old FST at an ASR system to cause the ASR system using the Old FST with the patch to recognize speech using a set of paths from a New FST. At act 410, all paths that are in the New FST and not in the Old FST may be identified and added to an ADD FST constructed from these paths, using an algorithm for adding paths to an FST, an example of which is provided below. At act 420, all paths that are in the Old FST and not in the New FST may be added to a REMOVE FST constructed from those paths, using the algorithm for adding paths to an FST. At act 430, the paths in the ADD FST may be added to the Old FST using the algorithm for adding paths to an FST, thus modifying the Old FST to include the additional paths from the New FST. At act 440, the paths in the REMOVE FST may be removed from the Old FST, using an algorithm for removing paths from an FST, an example of which is provided below. The result may be a modified Old FST that encodes the same set of paths as the New FST, although the graph structure of the modified Old FST may not be exactly identical to that of the New FST. Finally, at act 450, the patch may be extracted from the modified Old FST, encoding the delta differential between the original Old FST and its modified version. In some embodiments, as discussed above, the patch may include the set of all states that have been modified or newly added in the modified Old FST, together with those states' outgoing arcs and the target state IDs of those arcs.

Figure 5:
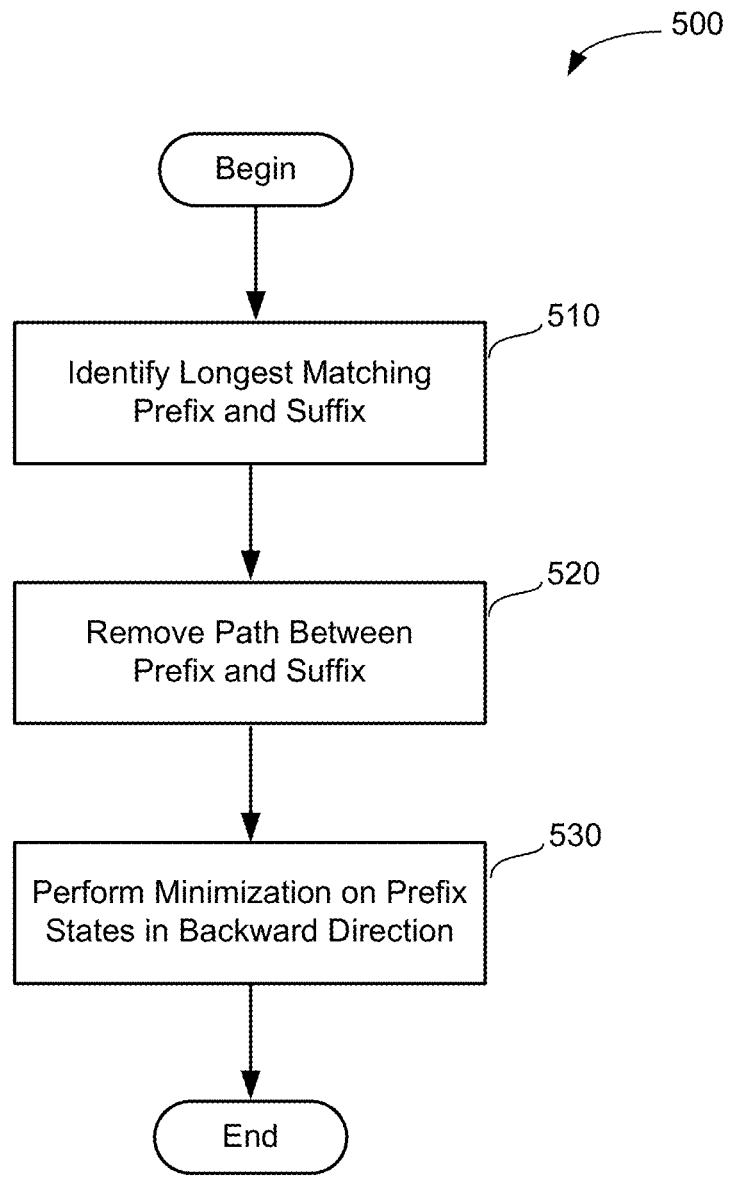
FIG. 5 illustrates an exemplary algorithm for removing a path from an FST in accordance with some embodiments.

FIG. 5 illustrates an exemplary algorithm 500 suitable for removing a path from an FST, which may be used, for example, at act 440 of algorithm 400 described above. At act 510 of algorithm 500, the longest matching prefix and suffix of the path to be removed may be identified in the FST. The prefix and suffix paths in the FST may include states and arcs that are shared by paths other than the path to be removed, while the matching path between the prefix and suffix paths may include only states and arcs that are unique to the path to be removed. In some embodiments, the prefix path may have states with single fan-in, and the suffix path may have states with single fan-out. At act 520, the path between the identified prefix and suffix paths (i.e., the portion of the path that includes only states and arcs unique to the path to be removed) may be removed from the FST. At act 530, a minimization algorithm may be performed on states in the prefix path, state by state in the backward direction (i.e., in the direction opposite to the directionality of the arcs in the path). An example of a minimization algorithm is provided below.

Figure 6:
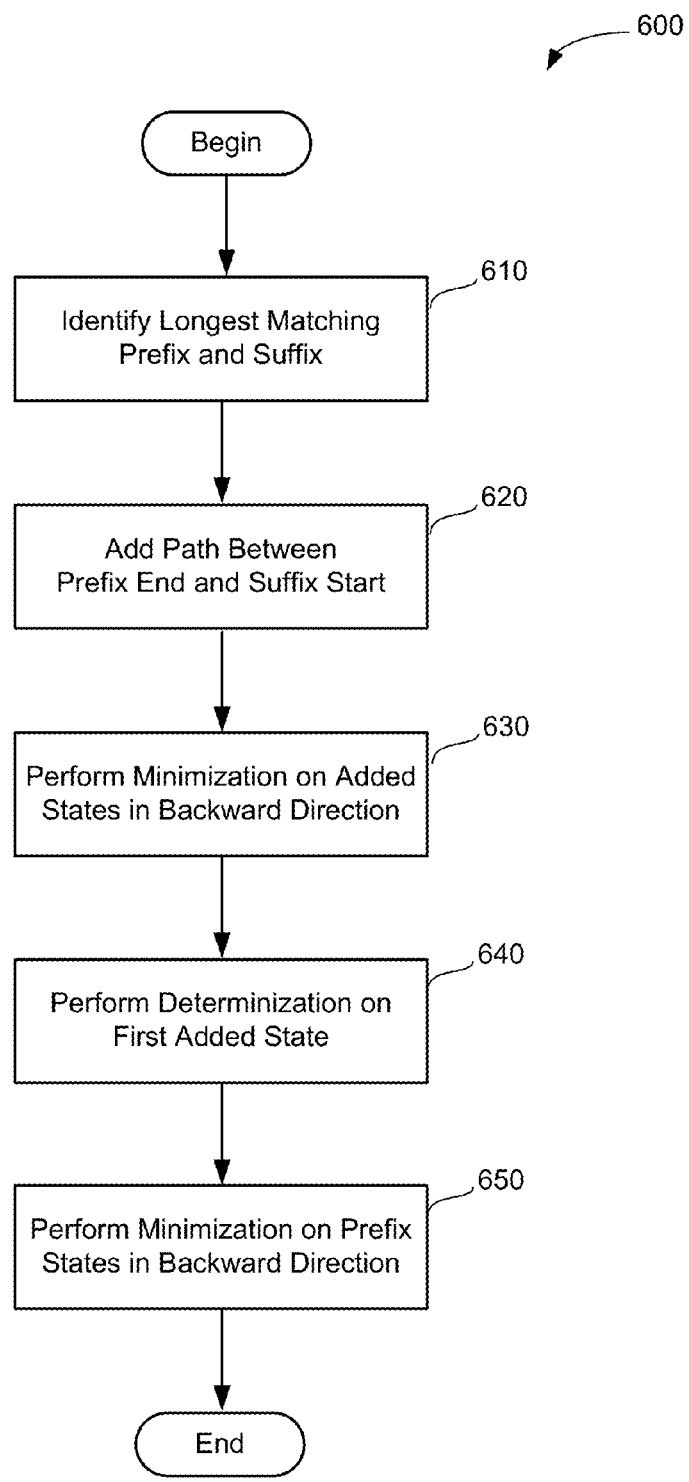
FIG. 6 illustrates an exemplary algorithm for adding a path to an FST in accordance with some embodiments.

FIG. 6 illustrates an exemplary algorithm 600 suitable for adding a path to an FST, which may be used, for example, at acts 410, 420, and 430 of algorithm 400 described above. At act 610 of algorithm 600, the longest matching prefix and suffix of the path to be added may be identified in the FST. The prefix path may be the longest path of arcs and states, extending in the forward direction from the initial state of the FST, that matches the path beginning at the initial state of the path to be added, and the suffix path may be the longest path of arcs and states, extending in the backward direction from the final state of the FST, that matches the path extending from the final state of the path to be added. At act 620, the states and arcs in the portion of the new path that extends between the end of the identified prefix path and the start of the identified suffix path may be added to the FST between the prefix end and the suffix start. At act 630, the minimization algorithm may be performed on the states in the added portion of the path, state by state in the backward direction. At act 640, a determinization algorithm may be performed on the first state in the added portion of the path. An example of a determinization algorithm is provided below. Finally, at act 650, the minimization algorithm may be performed on the states in the prefix path, state by state in the backward direction.

Figure 7:
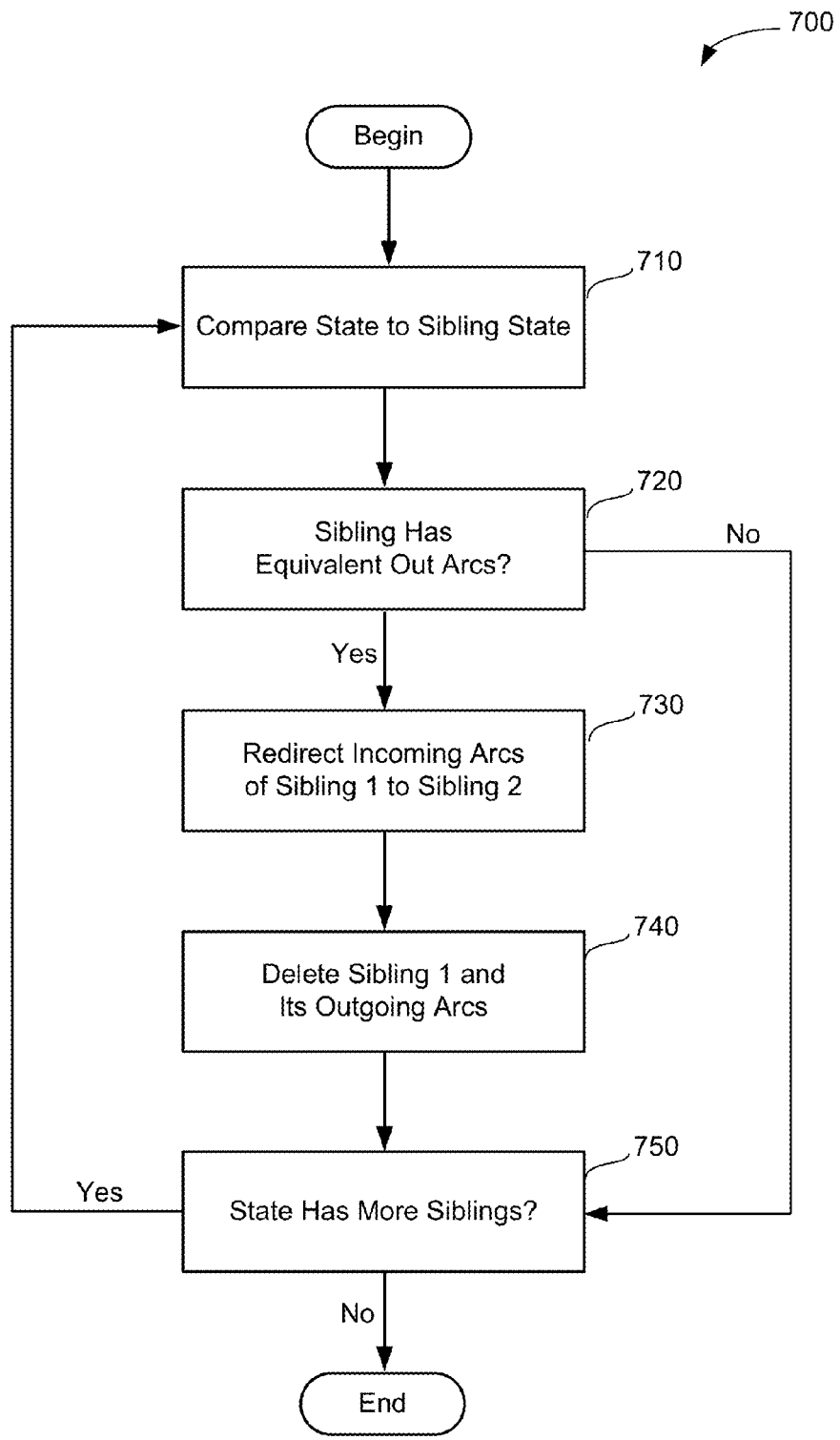
FIG. 7 illustrates an exemplary minimization algorithm for performing on a state in an FST in accordance with some embodiments.

FIG. 7 illustrates an exemplary minimization algorithm 700 suitable for performing at act 530 of algorithm 500 and acts 630 and 650 of algorithm 600 described above. At act 710 of algorithm 700, the state on which the minimization algorithm is being performed may be compared to a sibling state, the sibling state being a state in the FST that has an outgoing arc to a target state to which the state on which the minimization algorithm is being performed also has an outgoing arc. At act 720, a determination may be made as to whether all of the outgoing arcs of the sibling state are equivalent (i.e., having the same labels and target state IDs) to the outgoing arcs of the state on which the minimization algorithm is being performed. If not, then the algorithm may jump to act 750. If all of the outgoing arcs of the two sibling states (i.e., the state on which the minimization algorithm is being performed and its sibling state) are equivalent, then at act 730 the incoming arcs of one of the sibling states may be redirected to the other sibling state, and at act 740 the state whose incoming arcs were redirected may be deleted (along with its outgoing arcs). At act 750, a determination may be made as to whether the state on which the minimization algorithm is being performed has more siblings to be considered. If so, the algorithm may loop back to act 710 to consider the next sibling state. If not, the algorithm may end.

Figure 8:
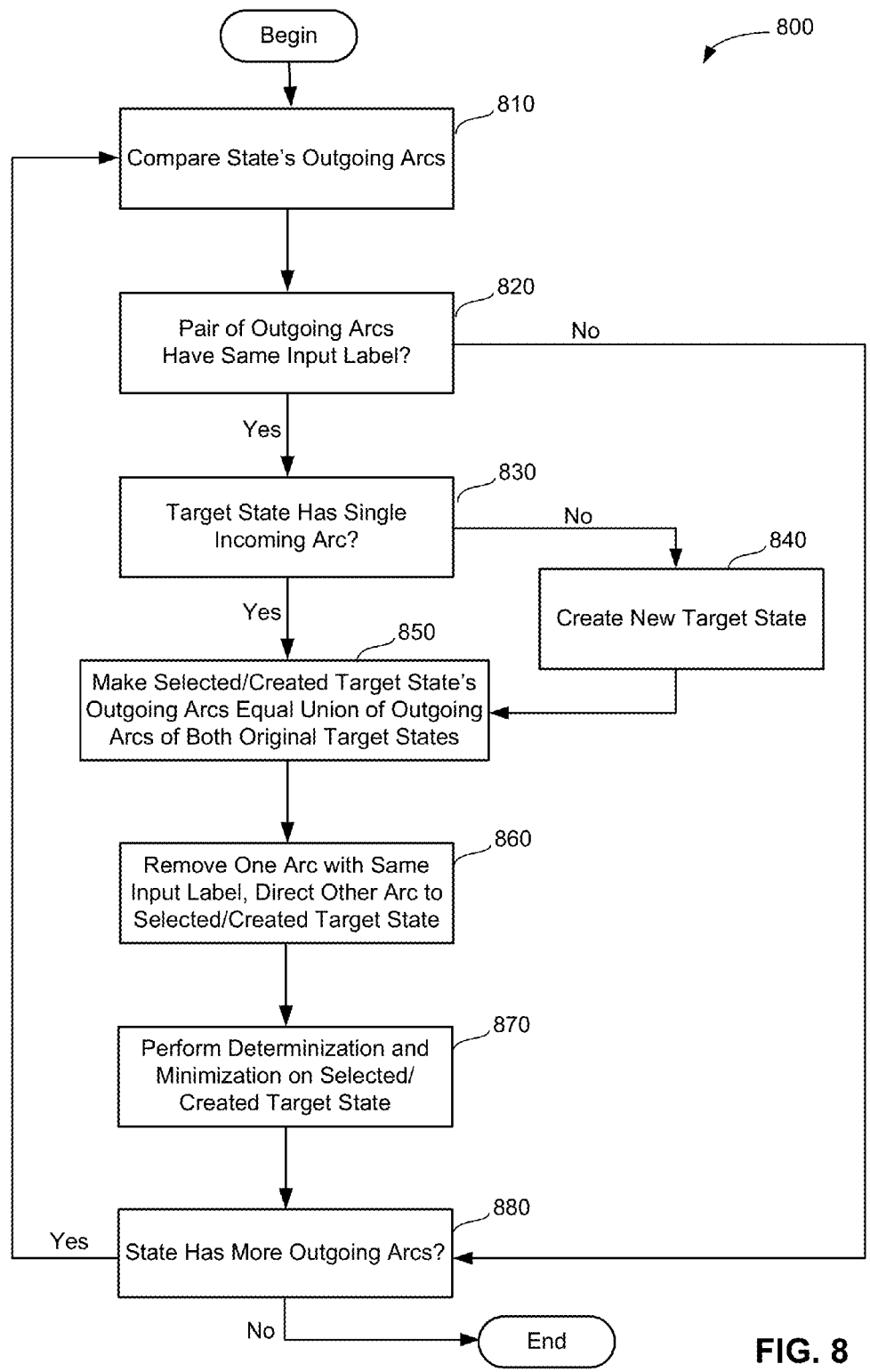
FIG. 8 illustrates an exemplary determinization algorithm for performing on a state in an FST in accordance with some embodiments.

FIG. 8 illustrates an exemplary determinization algorithm suitable for performing at act 640 of algorithm 600 described above. At act 810 of algorithm 800, the outgoing arcs of the state being determinized may be compared to each other. At act 820, a determination may be made as to whether any pair of outgoing arcs of the state being determinized have the same input label. If not, then the algorithm may jump to act 880. If a pair of outgoing arcs do have the same input label, then at act 830a determination may be made as to whether the target state of either outgoing arc has only a single incoming arc. If so, then that target state may be selected to receive the determinized outgoing arc of the state being determinized. If neither target state has only a single incoming arc, then at act 840 a new target state may be created. At act 850, the outgoing arcs of the selected or created target state may be made equal to the union of the outgoing arcs of both of the original target states of the pair of outgoing arcs of the state being determinized. If necessary, this may involve creating new arc copies. At act 860, one of the outgoing arcs with the same input label from the state being determinized may be removed, and the other outgoing arc may be directed to the selected or created target state. At act 870, the determinization and minimization algorithms may be performed on the selected or created target state. At act 880, a determination may be made as to whether the state originally being determinized has more outgoing arcs to be considered. If so, the algorithm may loop back to act 810 to consider the next pair of outgoing arcs. If not, the algorithm may end.

Those of skill in the art will appreciate that, taken together, the exemplary algorithms illustrated in FIGS. 4-8 result in construction of a patch that, destructively applied to a first FST, would create a modified version of the first FST that includes the paths of a second FST and is also globally minimized and determinized. As discussed above, in some embodiments this may provide benefits of reducing transmission bandwidth and/or time, storage space, and/or computational overhead in connection with the patch, and/or may improve recognition speed and/or accuracy. However, this is not a limitation of some embodiments, and some embodiments may construct patches that are not fully minimized and/or not fully determinized. Additionally, it should be appreciated that the specific algorithms provided above are merely examples, and other implementations are possible for achieving minimization and/or determinization in some embodiments.

For further illustration, FIGS. 9-12 step through an example applying the exemplary algorithms described above. FIG. 9A illustrates an exemplary FST A, in this case a word-to-sentence transducer that encodes a very simple toy ASR grammar. This grammar encoded by exemplary FST A in FIG. 9A consists of a set of four valid recognizable sentences, which sentences might be said, for example, as commands to a virtual agent on a mobile device to retrieve the user's financial information. These sentences are encoded as four potential paths traversing the states and arcs of FST A:

1. I want my account balance.
2. I want the account balance.
3. I need my account balance.
4. I need the account balance.

Figure 9A:
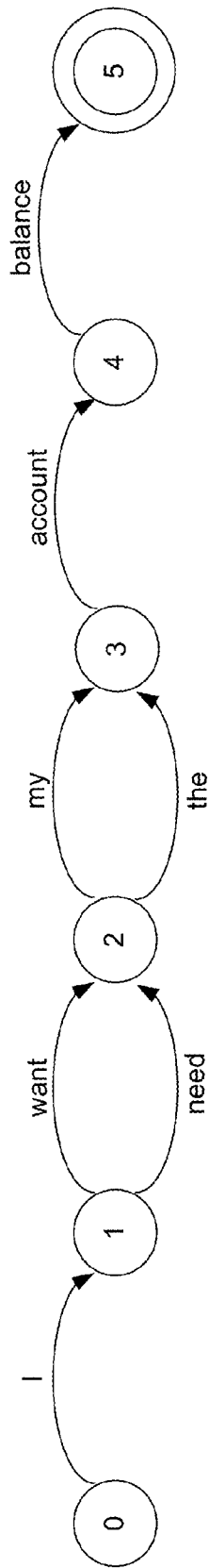
FIG. 9A illustrates an exemplary FST A in accordance with some embodiments.
Figure 9B:
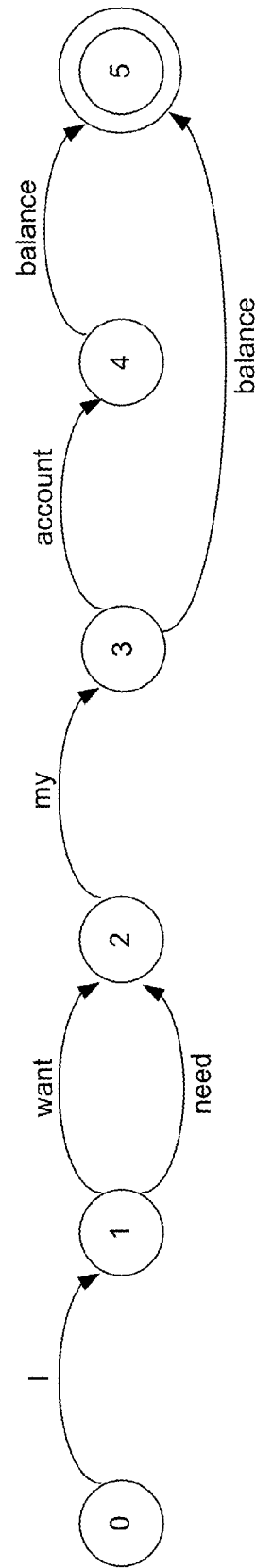
FIG. 9B illustrates an exemplary FST B in accordance with some embodiments.

FIG. 9B illustrates an exemplary FST B representing an updated version of FST A. FST B in FIG. 9B represents an update to remove two of the recognizable sentences from FST A, and to add two new sentences that were not previously recognizable using FST A. The updated set of recognizable sentences are encoded as four potential paths traversing the states and arcs of FST B:

1. I want my account balance.
2. I want my balance.
3. I need my account balance.
4. I need my balance.

Figure 10A:
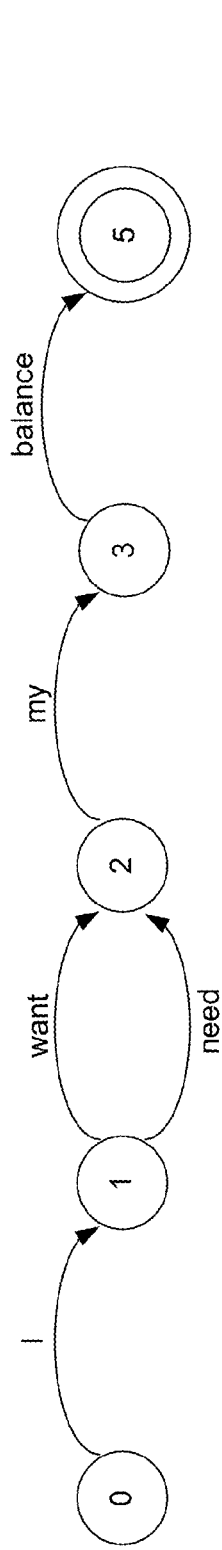
FIG. 10A illustrates an exemplary ADD FST in accordance with some embodiments.

FIG. 10A illustrates the ADD FST constructed from all paths in FST B that are not in FST A. These include the paths representing the following sentences, which are to be added to FST A in modifying it to perform as FST B:

1. I want my balance.
2. I need my balance.

Figure 10B:
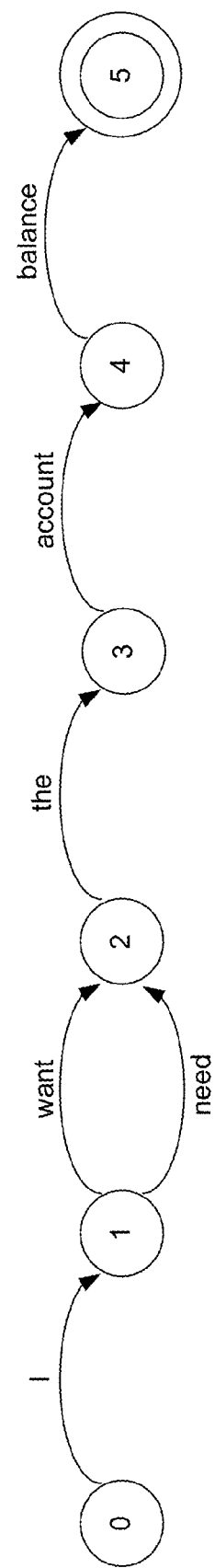
FIG. 10B illustrates an exemplary REMOVE FST in accordance with some embodiments.

FIG. 10B illustrates the REMOVE FST constructed from all paths in FST A that are not in FST B. These include the paths representing the following sentences, which are to be removed from FST A in modifying it to perform as FST B:

1. I want the account balance.
2. I need the account balance.

Figure 11A:
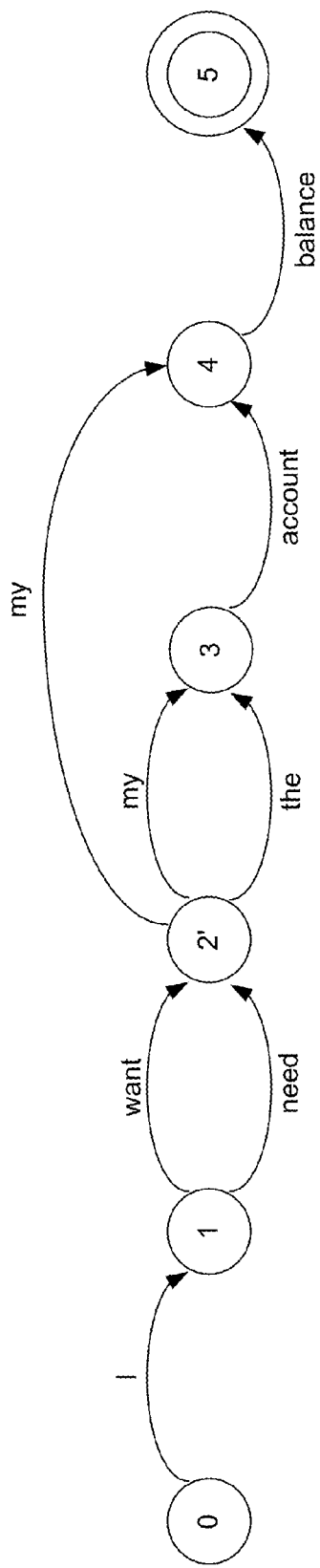
FIG. 11A illustrates an exemplary modified FST A with added paths in accordance with some embodiments.
Figure 11B:
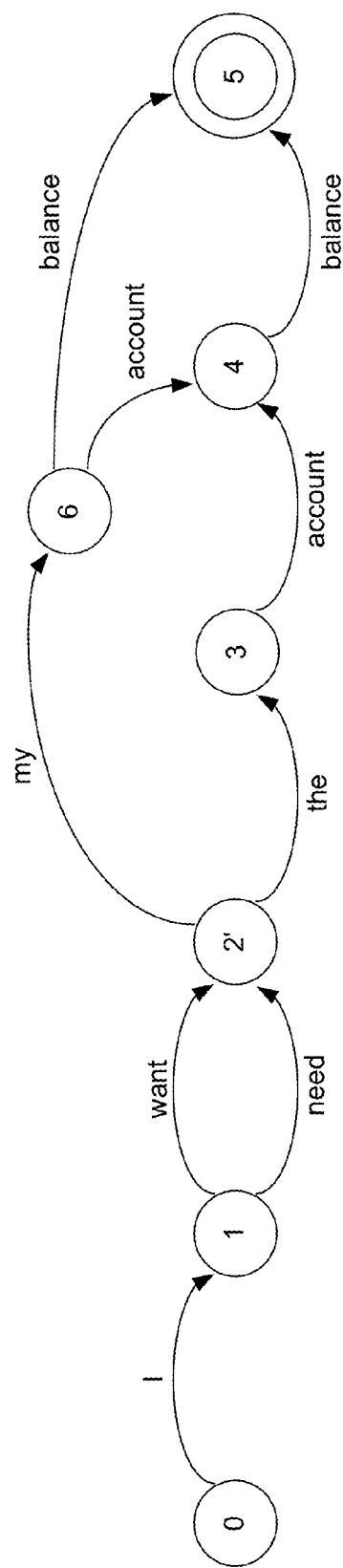
FIG. 11B illustrates an exemplary modified FST A with added, minimized, determinized paths in accordance with some embodiments.

FIGS. 11A and 11B illustrate the modification of FST A to add the paths in the ADD FST of FIG. 10A. In FIG. 11A, states 0 and 1 and their outgoing arcs are identified as the longest matching prefix in FST A for the ADD FST, and state 4 and its outgoing arc to state 5 are identified as the longest matching suffix. Adding the path between the prefix and suffix then involves modifying state 2 (indicated in FIG. 11A by changing the state ID to 2') to add an outgoing arc with input label "my" targeting state 4. There are no states requiring minimization in the resulting FST of FIG. 11A, but a comparison of the outgoing arcs of modified state 2' indicates that determinization is called for, because a pair of outgoing arcs from modified state 2' have the same input label "my." FIG. 11B shows the result of applying the determinization algorithm described above. As neither target state 3 nor target state 4 of the outgoing arcs of state 2' with the same input label has only a single incoming arc, a new target state 6 is created. Target state 6 is given outgoing arcs equal to the union of the outgoing arcs of original target states 3 and 4, including an outgoing arc with input label "account" targeting state 4 (corresponding to the outgoing arc of state 3) and an outgoing arc with input label "balance" targeting state 5 (corresponding to the outgoing arc of state 4). One of the outgoing arcs from state 2' with the same input label "my" is then deleted, and the other is directed to new target state 6. The resulting modified FST A in FIG. 11B then encodes all of the original paths of FST A plus the two additional paths from FST B:

1. I want my balance.
2. I want my account balance.
3. I want the account balance.
4. I need my balance.
5. I need my account balance.
6. I need the account balance.

Figure 12A:
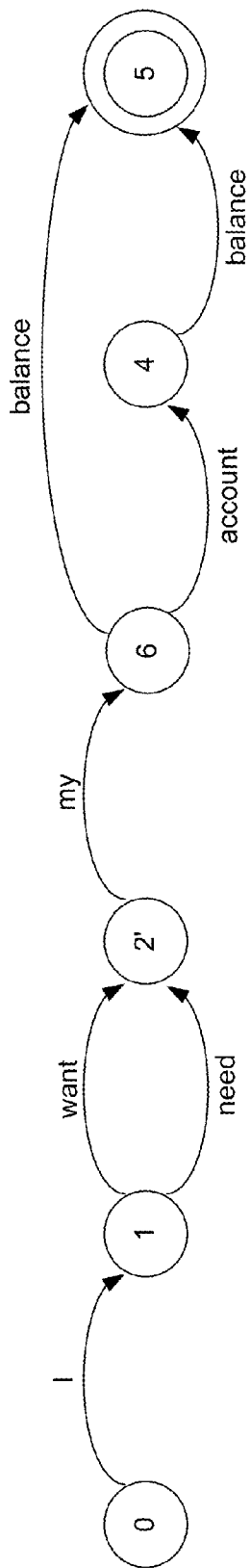
FIG. 12A illustrates an exemplary modified FST A with added and removed paths in accordance with some embodiments.

FIG. 12A illustrates the further modification of FST A to remove the paths in the REMOVE FST of FIG. 10B. In FIG. 12A, states 0 and 1 and their outgoing arcs to state 2' are identified as the longest matching prefix in the modified FST A for the REMOVE FST, and state 4 and its outgoing arc to state 5 are identified as the longest matching suffix. Removing the path between the prefix and the suffix then involves further modifying state 2' to remove the outgoing arc to state 3. This effectively removes state 3 and its outgoing arc from the FST as well, since state 3 has no remaining incoming arc by which it can be reached. The result in FIG. 12A is a modified FST A that encodes the same paths as FST B, although with some differences in state IDs and graph structure. The additional paths included in FST B are now encoded by the modified FST A, and the paths not included in FST B that were removed from modified FST A are now disallowed for recognition:

1. I want my balance.
2. I want my account balance.
3. I need my balance.
4. I need my account balance.

Figure 12B:
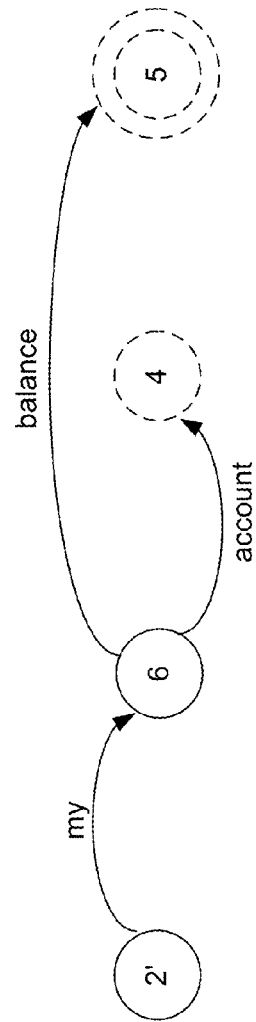
FIG. 12B illustrates an exemplary patch extracted from exemplary modified FST A.

FIG. 12B illustrates the patch extracted from the modified FST A in FIG. 12A. The patch in FIG. 12B consists of all of the modified and new states in the modified FST A (i.e., modified state 2' and new state 6), together with their outgoing arcs and the state IDs of the target states of the outgoing arcs. (States 4 and 5, which are unmodified in FIG. 12A and thus are not included as modified or new states in the patch, are represented with dashed outlines in FIG. 12B to indicate the inclusion of their state IDs as target state IDs for the outgoing arcs of new state 6 in the patch.) One exemplary data representation of the patch illustrated in FIG. 12B may be as a table including the following information:

| State ID | Status | Original State ID | Outgoing Arc 1 Target ID | Outgoing Arc 1 Input Label | Outgoing Arc 2 Target ID | Outgoing Arc 2 Input Label |
|---|---|---|---|---|---|---|
| 2' | Modified | 2 | 6 | my | — | — |
| 6 | New | — | 5 | balance | 4 | account |

As an example of the non-destructive application of the patch in FIG. 12B to the FST A of FIG. 9A, consider the run-time recognition of the speech input, "I want my account balance." The recognizer may begin by initiating traversal of FST A at initial state 0. The first word of the input, "I", corresponds to the only outgoing arc from the initial state 0, which brings the recognizer to state 1. The next word of the input, "want," then leads the recognizer to follow the "want" arc transition from state 1 to state 2 in FST A. At this point, the recognizer may determine from the look-up table provided with the patch that the patch includes a modified state 2' corresponding to original state 2. The recognizer may therefore switch to traversal of the modified state 2' in the patch. The next word of the input, "my," corresponds to the only outgoing arc from modified state 2', which transitions to new state 6 included in the patch. The next word of the input, "account," corresponds to outgoing arc 2 from new state 6, which is listed in the patch data structure as targeting state 4. State 4 is part of original FST A, and so the recognizer may then return to traversing FST A from state 4. The final word of the input, "balance," causes the recognizer to follow the only outgoing arc from state 4 in FST A, ending at the final state 5.

Figure 13:
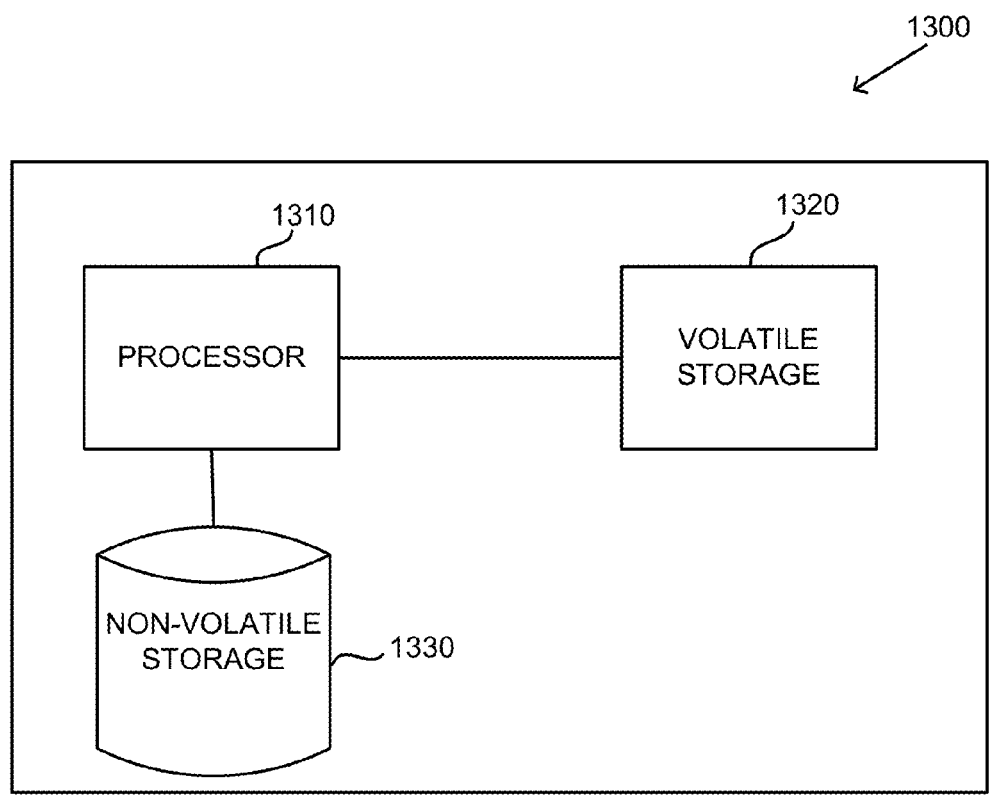
FIG. 13 illustrates an exemplary computer system via which some embodiments may be implemented.

An illustrative implementation of a computer system 1300 that may be used in connection with some embodiments (e.g., for implementation of server 120 and/or ASR system 110) is shown in FIG. 13. One or more computer systems such as computer system 1300 may be used to implement any of the functionality described above. The computer system 1300 may include one or more processors 1310 and one or more computer-readable storage media (i.e., tangible, non-transitory computer-readable media), e.g., volatile storage 1320 and one or more non-volatile storage media 1330, which may be formed of any suitable non-volatile data storage media. The processor 1310 may control writing data to and reading data from the volatile storage 1320 and/or the non-volatile storage device 1330 in any suitable manner, as embodiments are not limited in this respect. To perform any of the functionality described herein, processor 1310 may execute one or more instructions stored in one or more computer-readable storage media (e.g., volatile storage 1320 and/or non-volatile storage 1330), which may serve as tangible, non-transitory computer-readable media storing instructions for execution by the processor 1310.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments described herein comprises at least one computer-readable storage medium (i.e., at least one tangible, non-transitory computer-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs above-discussed functionality. The computer-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of updating an automatic speech recognition (ASR) system, the method comprising:
    compiling a first finite-state transducer (FST) from a set of one or more ASR models, the first FST comprising a first set of paths defining a first set of speech sequences for the ASR system to recognize based on the set of ASR models;
    initializing the ASR system to use the first FST in recognizing speech, by causing the first FST to be stored at the ASR system;
    in response to an update to the set of ASR models, compiling a second FST from the updated set of ASR models, the second FST comprising a second set of paths defining a second set of speech sequences for the ASR system to recognize based on the updated set of ASR models, the second set of speech sequences being different from the first set of speech sequences by at least one speech sequence;
    by analyzing the second FST together with the first FST via execution of stored instructions by at least one processor, extracting a patch representing the difference between the first FST and the second FST, the patch being configured to be applied non-destructively to the first FST at the ASR system to cause the ASR system to use the second set of paths from the second FST in recognizing speech, wherein extracting the patch comprises
        generating a third FST by
            adding to the first FST paths that are in the second FST and not in the first FST and
            removing from the first FST paths that are in the first FST and not in the second FST,
        resulting in the third FST encoding the second set of paths of the second FST in a different graph structure than the second FST, and
        forming the patch of states in the third FST that are modified and/or added with respect to the first FST; and
    providing the extracted patch to the ASR system as an update.

2. The method of claim 1, wherein extracting the patch comprises configuring the patch such that destructively applying the patch to the first FST creates a modified version of the first FST that comprises the second set of paths from the second FST and is globally minimized.

3. The method of claim 1, wherein applying the patch non-destructively to the first FST comprises:
    initiating traversal of the first FST, as stored in non-volatile memory accessible by the ASR system, to recognize a speech input; and
    during the traversal of the first FST, upon encountering a state in the first FST that has a modified version in the patch, switching to traversal of the modified version of the encountered state in the patch, to recognize the speech input.

4. The method of claim 1, wherein the second FST is an updated version of the first FST.

5. The method of claim 1, wherein the second set of paths in the second FST comprises at least one path not included in the first FST.

6. The method of claim 1, wherein using the second set of paths from the second FST in recognizing speech comprises disallowing at least one path included in the first FST.

7. The method of claim 1, wherein the patch extracted by analyzing the second FST together with the first FST is a first patch, and wherein the method further comprises:
    accessing a fourth FST comprising a third set of paths defining a third set of speech sequences for the ASR system to recognize;
    by analyzing the fourth FST together with the second FST, extracting a second patch capable of being applied non-destructively to the first FST and the first patch at the ASR system to cause the ASR system to use the third set of paths from the fourth FST in recognizing speech.

8. The method of claim 7, further comprising providing the second patch to the ASR system as a second update.

9. Apparatus comprising:
    at least one processor; and
    at least one processor-readable storage medium storing processor-executable instructions that, when executed by the at least one processor, perform a method of updating an automatic speech recognition (ASR) system, the method comprising:
        compiling a first finite-state transducer (FST) from a set of one or more ASR models, the first FST comprising a first set of paths defining a first set of speech sequences for the ASR system to recognize based on the set of ASR models;
        initializing the ASR system to use the first FST in recognizing speech, by causing the first FST to be stored at the ASR system;
        in response to an update to the set of ASR models, compiling a second FST from the updated set of ASR models, the second FST comprising a second set of paths defining a second set of speech sequences for the ASR system to recognize based on the updated set of ASR models, the second set of speech sequences being different from the first set of speech sequences by at least one speech sequence;
        by analyzing the second FST together with the first FST, extracting a patch representing the difference between the first FST and the second FST, the patch being configured to be applied non-destructively to the first FST at the ASR system to cause the ASR system to use the second set of paths from the second FST in recognizing speech, wherein extracting the patch comprises generating a third FST by
adding to the first FST paths that are in the second FST and not in the first FST and
removing from the first FST paths that are in the first FST and notm in the second FST,
resulting in the third FST encoding the second set of paths of the second FST in a different graph structure than the second FST, and
forming the patch of states in the third FST that are modified and/or added with respect to the first FST; and
providing the extracted patch to the ASR system as an update.

10. The apparatus of claim 9, wherein extracting the patch comprises configuring the patch such that destructively applying the patch to the first FST creates a modified version of the first FST that comprises the second set of paths from the second FST and is globally minimized.

11. The apparatus of claim 9, wherein applying the patch non-destructively to the first FST comprises:
initiating traversal of the first FST, as stored in non-volatile memory accessible by the ASR system, to recognize a speech input; and
during the traversal of the first FST, upon encountering a state in the first FST that has a modified version in the patch, switching to traversal of the modified version of the encountered state in the patch, to recognize the speech input.

12. The apparatus of claim 9, wherein the second FST is an updated version of the first FST.

13. The apparatus of claim 9, wherein the second set of paths in the second FST comprises at least one path not included in the first FST.

14. The apparatus of claim 9, wherein using the second set of paths from the second FST in recognizing speech comprises disallowing at least one path included in the first FST.

15. The apparatus of claim 9, wherein the patch extracted by analyzing the second FST together with the first FST is a first patch, and wherein the method further comprises:
accessing a fourth FST comprising a third set of paths defining a third set of speech sequences for the ASR system to recognize;
by analyzing the fourth FST together with the second FST, extracting a second patch capable of being applied non-destructively to the first FST and the first patch at the ASR system to cause the ASR system to use the third set of paths from the fourth FST in recognizing speech.

16. The apparatus of claim 15, wherein the method further comprises providing the second patch to the ASR system as a second update.

17. At least one computer-readable storage medium encoded with computer-executable instructions that, when executed, perform a method of updating an automatic speech recognition (ASR) system, the method comprising:
initializing the ASR system to use a first finite state transducer (FST) in recognizing speech, by storing the first FST at the ASR system, the first FST being compiled from a set of one or more ASR models and comprising a first set of paths defining a first set of speech sequences for the ASR system to recognize based on the set of ASR models;
receiving a patch extracted based on the first FST and a second FST compiled from an updated set of ASR models resulting from an update to the set of ASR models, the second FST comprising a second set of paths defining a second set of speech sequences for the ASR system to recognize based on the updated set of ASR models, the second set of speech sequences being different from the first set of speech sequences by at least one speech sequence, the patch representing the difference between the first FST and the second FST and being configured to cause the ASR system to use the second set of paths from the second FST in recognizing speech;
receiving a speech input; and
recognizing the speech input using the received patch applied non-destructively to the first FST stored at the ASR system.

18. The at least one computer-readable storage medium of claim 17, wherein recognizing the speech input comprises:
computing a first recognition result by applying to the speech input the first FST;
computing a second recognition result by applying to the speech input the first FST with the patch applied non-destructively to the first FST; and
determining a final recognition result by comparing the first and second recognition results.

19. The at least one computer-readable storage medium of claim 17, wherein the patch extracted based on the first FST and the second FST is a first patch, and wherein the method further comprises:
receiving a second patch extracted based on the second FST and a third FST comprising a third set of paths defining a third set of speech sequences for the ASR system to recognize, the second patch being configured to be applied non-destructively to the first FST and the first patch at the ASR system to cause the ASR system to use the third set of paths from the third FST in recognizing speech.

20. The at least one computer-readable storage medium of claim 19, wherein the method further comprises:
merging the first patch and the second patch into a combined patch configured to be applied non-destructively to the first FST to cause the ASR system to use the third set of paths from the third FST in recognizing speech;
receiving a second speech input; and
recognizing the second speech input using the combined patch applied non-destructively to the first FST.

* * * * *